INVENTOR.
BRUCE E. DIXSON
BY
Herbert E. Metcalf
Attorney

Dec. 17, 1957     B. E. DIXSON     2,816,448
DIRECTIONAL GYRO
Filed June 17, 1949     8 Sheets-Sheet 3
Fig. 4
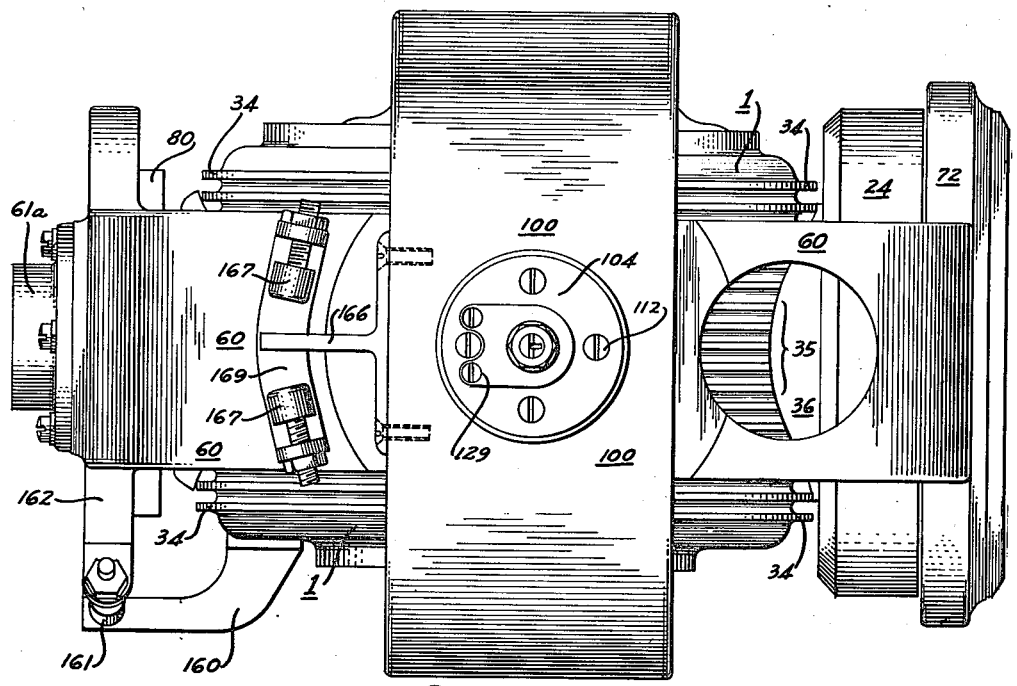
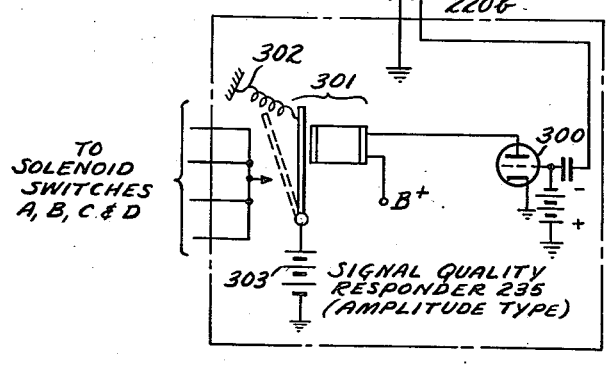
Fig. 11
INVENTOR.
BRUCE E. DIXSON
BY
Herbert E. Metcalf
Attorney Dec. 17, 1957  B. E. DIXSON  2,816,448
DIRECTIONAL GYRO
Filed June 17, 1949  8 Sheets-Sheet 4
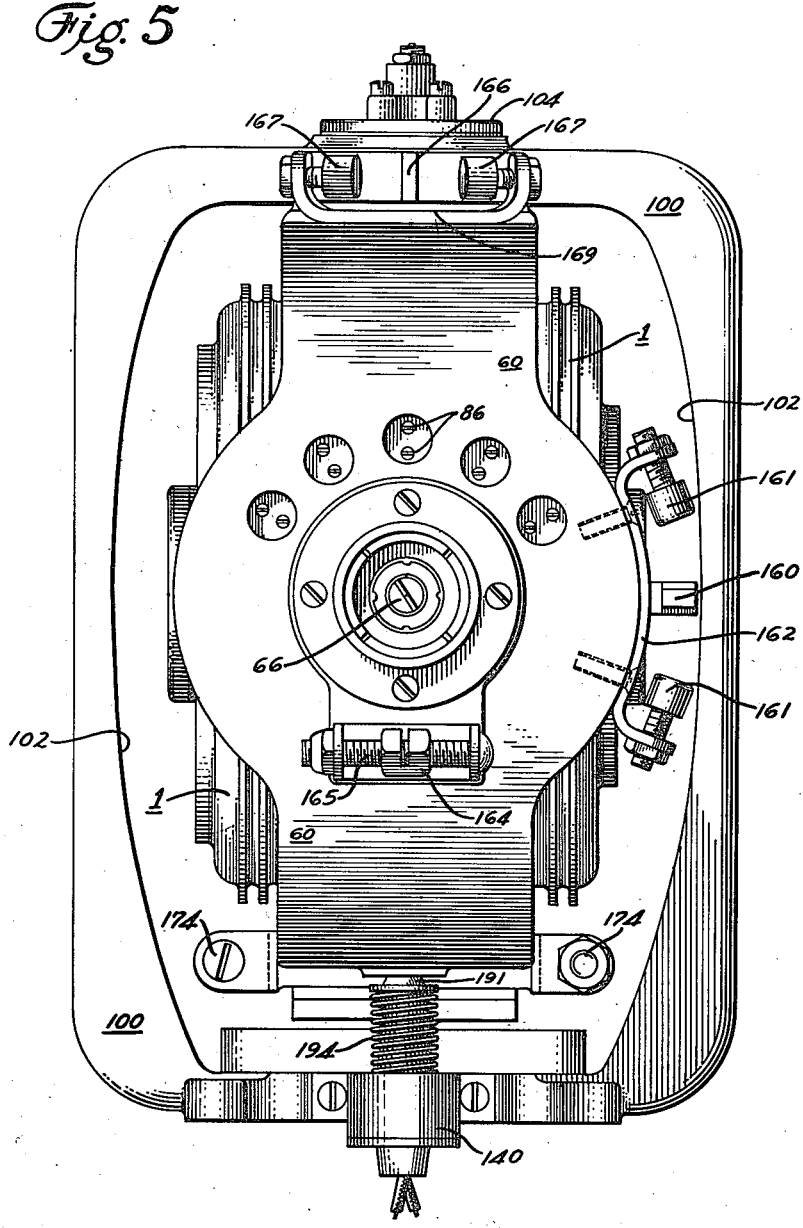
INVENTOR.
BRUCE E. DIXSON
BY
Herbert E. Metcalf
Attorney Dec. 17, 1957  B. E. DIXSON  2,816,448
DIRECTIONAL GYRO
Filed June 17, 1949  8 Sheets-Sheet 5

INVENTOR.
BRUCE E. DIXSON
BY
Herbert E. Metcalf
Attorney

Dec. 17, 1957   B. E. DIXSON   2,816,448
DIRECTIONAL GYRO
Filed June 17, 1949   8 Sheets-Sheet 6
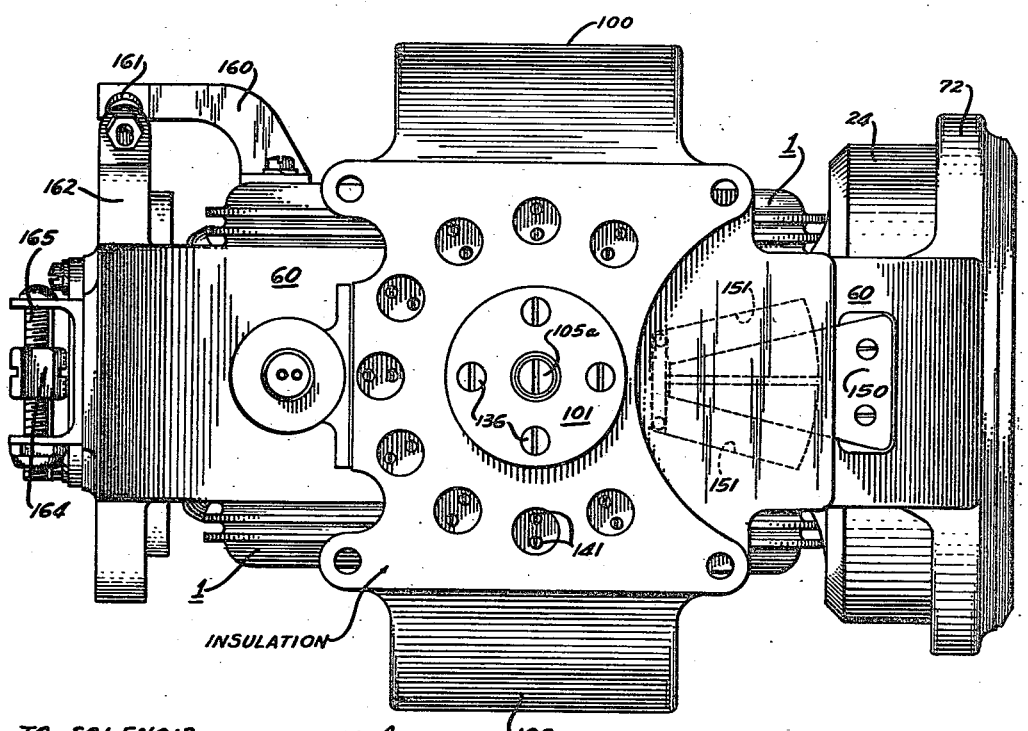
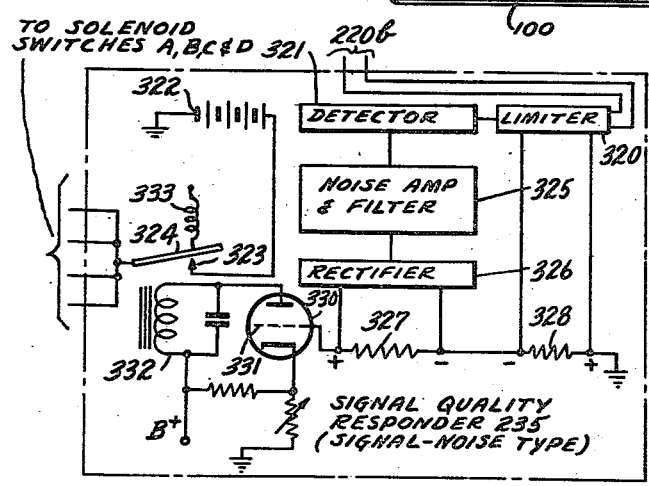
INVENTOR.
BRUCE E. DIXSON
BY
*Herbert E. Metcalf*
Attorney Dec. 17, 1957  B. E. DIXSON  2,816,448
DIRECTIONAL GYRO
Filed June 17, 1949  8 Sheets-Sheet 7

INVENTOR.
BRUCE E. DIXSON
BY Herbert E. Metcalf
Attorney

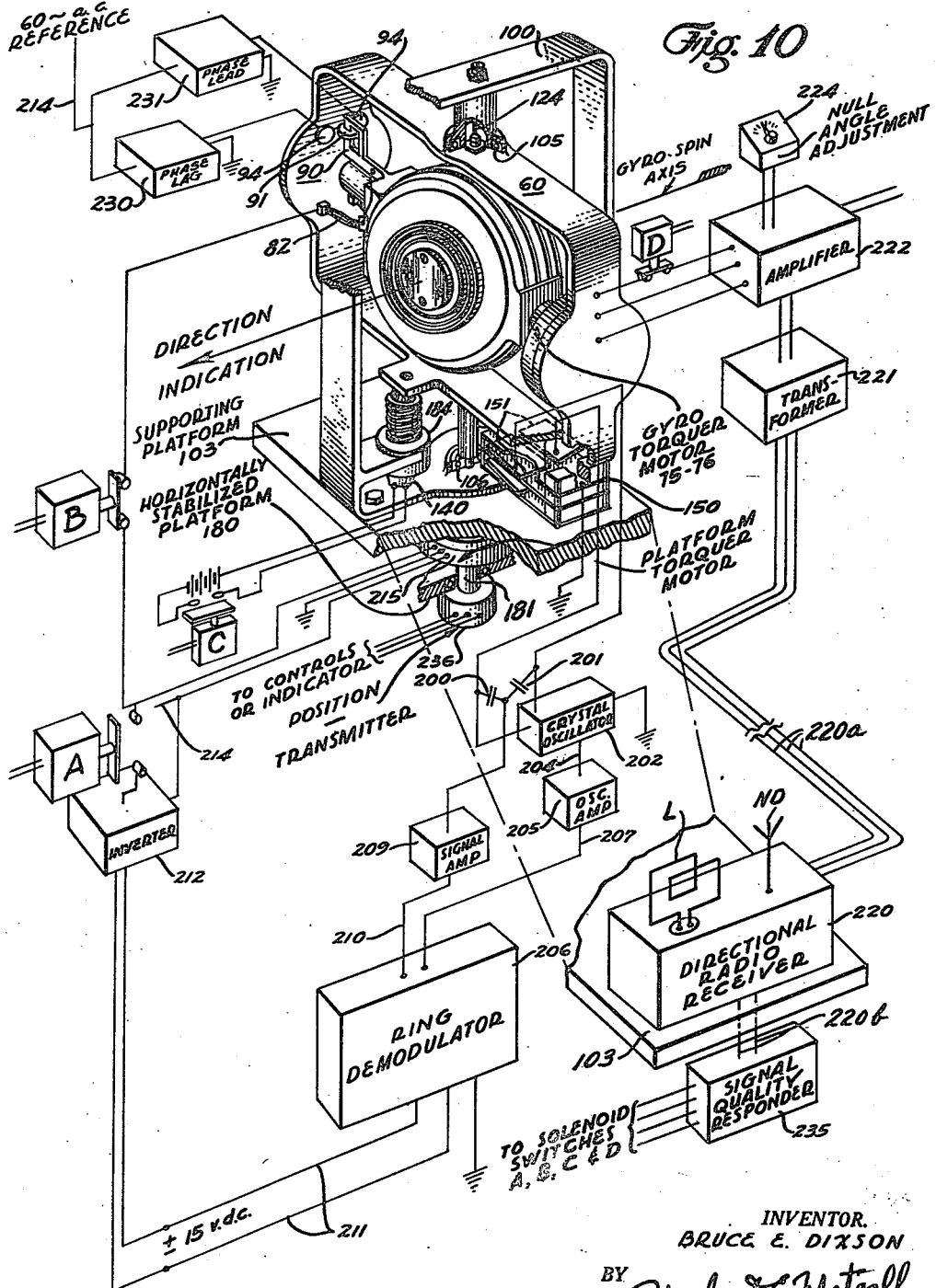

United States Patent Office 2,816,448
Patented Dec. 17, 1957

2,816,448
DIRECTIONAL GYRO

Bruce E. Dixson, Hawthorne, Calif., assignor to Northrop Aircraft, Inc., Hawthorne, Calif., a corporation of California Application June 17, 1949, Serial No. 99,651

15 Claims. (Cl. 74—5.4)

The present invention relates to gyroscopes, hereinafter referred to as gyros, and more particularly to a highly accurate precision gyro that can be effectively used to indicate direction, both under control of a monitoring device, and free from such control.

Directional gyros of the highest accuracy are required for the guidance of missiles that travel substantial distances without human pilots. When the spin axis of a gyro is free in inertial space, and placed in a certain position, the axis would remain fixed in inertial space indefinitely if no torques were applied about any of the axes of the gyro suspension. The gyro would, under such ideal conditions, provide an ideal directional reference. However, this ideal can only be approached since under actual conditions random torques cause spurious drift of the gyro axis. These torques are mainly due to bearing friction, unbalance, and airflows; and also are due to power lead and position sensing device torques.

The term directional gyro as used herein is broadly defined as a gyro having its spin axis normally in a horizontal plane pointing in a predetermined direction and resisting deviation from this direction. More specifically it is preferred to mount the gyro in a case and to journal the gyro case to rotate in a gimbal on a horizontal axis at right angles to the spin axis. The gimbal is then mounted to rotate on a vertical axis in a main frame attached to a platform which is maintained substantially horizontal by other means and is mounted in a vehicle. As the platform is turned in the horizontal plane, the stability of the spin axis of the gyro causes relative movement of the gimbal and platform. When the platform is slaved to the gyro, the platform serves as a directional reference for the vehicle.

It is an object of the present invention to provide a gyro which permits a precise approach to be made to the ideal, an approach that is predictable to within very close limits for reasonable periods of time.

The present invention involves special constructional features in addition to the normal care that would naturally be taken in the design, selection, fitting, and balancing of those components contributing to gyro inaccuracies.

Accordingly it is another object of the present invention to reduce by special construction, all airflow, bearing, power lead, and position sensing device torques to a minimum where, when combined with the minimum torques remaining after precision workmanship on parts and assembly of the gyro, the total of the spurious torques is sufficiently low to permit free gyro operation with an anomalous drift of less than 1° an hour. Certain of these special features are separately shown, described and claimed in my copending applications, Serial Nos. 99,652 and 99,654, both filed on June 17, 1949, which have become, respectively, Patent No. 2,708,369, granted May 17, 1955, and Patent No. 2,709,244, granted May 24, 1955.

In the control of guided missiles, for example, where a gyro is utilized to indicate and/or control direction, circumstances may occur where it is highly desirable to operate this directional gyro either as a free gyro or as a monitored gyro, shifting from one condition to the other at the will of signals or conditions as sensed at the missile, or upon a time schedule.

It is still another object of the present invention to provide a directional gyro assembly that can be operated either as a free gyro, or as a caged gyro under the control of a direction monitor such as, for example, a flux valve for sensing the earth's magnetic field; one or more star tracking telescopes; or, a radio direction indicator.

It is a still further object of the invention to provide a novel means and method of controlling a caged gyro.

In the caged condition referred to herein, the inner gimbal is locked to the supporting platform against relative rotation about the vertical axis. In this condition the spin axis of the gyro is directionally caged directly to the supporting platform and therefore cannot operate as a directional gyro but does provide stability for the platform, as the spin axis of the gyro is left free to move in a vertical plane. Under these conditions the gyro can be monitored.

It is still another object of the present invention to provide a novel means and method of monitoring a directional gyro having its spin axis free to move in a vertical plane; but which is locked against relative movement, in a horizontal plane, with respect to its supporting platform which is rotatable.

Under these latter conditions the present invention involves the control of the gyro by the application of precession torques initiated by a monitor, these precession torques being applied to tend to change the angle of the spin axis of the gyro to the horizontal. These torques, instead, according to the principle of precession, rotate the gyro and its support about the vertical axis. Means are also provided for sensing any such tilt of the spin axis of the gyro to the horizontal, due to the consequence of precession, and for application of the resultant signals to aid the turning of the supporting platform on its vertical axis, thereby slaving the platform to the monitor. Such an arrangement also has a definite advantage in that frictional torques due to friction in the bearings supporting the platform for rotation around a vertical axis can be made to be unimportant.

Accordingly it is a still further object of the invention to provide a means and method of compensating for the effect of bearing friction on a directional gyro by reaction of the gyro itself to frictional torques.

Briefly stated, the present invention in a preferred form includes the use of an electrically driven gyro mounted with the spin axis of the gyro horizontal. The gyro case is mounted in a gimbal to rotate on a horizontal axis at right angles to the spin axis. The gimbal is mounted to rotate on a vertical axis in an outer frame that is attached to a supporting platform also mounted for rotation on a vertical axis with respect to a horizontally stabilized platform mounted in the vehicle carrying the gyro assembly. Means are provided for locking the gimbal to the frame at will, and when so locked, means are provided to apply torque to the gyro case about its horizontal axis under the control of a directional monitor. Precession of the rotatable follower platform and the gimbal about the vertical axis due to this torque results in a frictional reaction about the vertical axis which causes the spin axis of the gyro to be tilted in a vertical plane with respect to the gimbal. Means are provided for sensing this tilt and the signals resulting from this latter sensing are directly applied to help rotate the supporting platform and locked gimbal on its vertical axis to indicate the proper direction with respect to the vehicle. When the gimbal is unlocked from the outer gimbal or follower frame, a separate system senses relative rotation between gimbal and frame to provide separate signals to rotate the supporting platform to the spin axis direction. Thus either when caged or uncaged, the supporting platform follows and is in line with the direction of the spin axis of the gyro, and because of the stabilizing effect of the gyro when uncaged, the supporting platform will indicate direction in the absence of monitoring signals during time lapses of considerable length.

In order that the anomalous drift of the gyro be kept at a minimum during such periods as the device is operating as a free gyro, all electrical leads crossing bearings in the gyro assembly are preferably formed of a plurality of fine conductors placed closely adjacent and parallel, with the general plane of the lead at right angles to the direction of relative motion; all weight is removed from the bearing around the vertical axis of the gimbal by suspending this gimbal on a fine wire. In addition, relative movement of the inner gimbal and the outer gimbal or follower frame, is sensed entirely capacitatively, thereby eliminating any substantial sensing torque. These special precautions, together with precision workmanship in the parts and assembly result in a directional gyro which when acting as a free gyro will have an anomalous drift of less than 1° per hour.

The above recited objects and advantages and others, will be more fully understood by reference to the accompanying drawings showing one preferred form of the invention in detail.

In the drawings:

Figure 4 is a top view of the gyro assembly of Figure 3.

Figure 5 is an elevational view of the power lead end of the gyro assembly of Figure 3.

Figure 7 is a bottom view of the gyro assembly of Figure 3.

Figure 1:
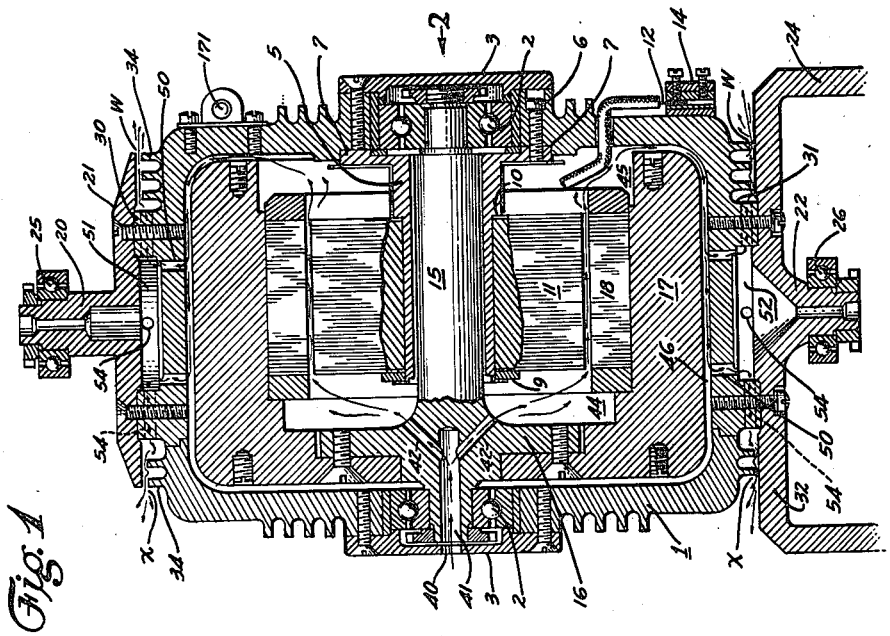
Figure 1 is a cross sectional view of the gyro and case, showing the air cooling system.

In Figures 1 to 9, inclusive, a showing of a gyro supporting platform, a platform torquer motor, and a platform position transmitter have been omitted to simplify the figures. The relation of these elements to the gyro assembly shown in Figures 1 to 9, inclusive, is illustrated in Figure 10.

Figure 10 is a perspective schematic diagram of the gyro assembly and control circuits therefor when used as a directional gyro, the gyro and control circuits being shown in caged condition.

In Figure 10, the location and form of some of the gyro assembly parts has been changed for clarity of illustration.

Figures 11 and 12 illustrate signal-quality responders of the amplitude type and signal-noise type, respectively.

In the ensuing description the immediately following definitions of the various axes involved in the gyro assembly shown in the drawings will be adhered to throughout the specification.

(1) *Spin axis.*—This is the axis of rotation of the gyro motor rotor. Except for deviations due to precession, this axis in the directional gyro assembly is horizontal.

(2) *Horizontal axis.*—This is the axis of rotation of the gyro case containing the gyro motor and is at right angles to the spin axis.

(3) *Vertical axis.*—This is the axis of rotation of the inner gimbal.

(4) *Platform axis.*—This axis is vertical and coaxial with the vertical axis of rotation of the inner gimbal.

Figure 2:
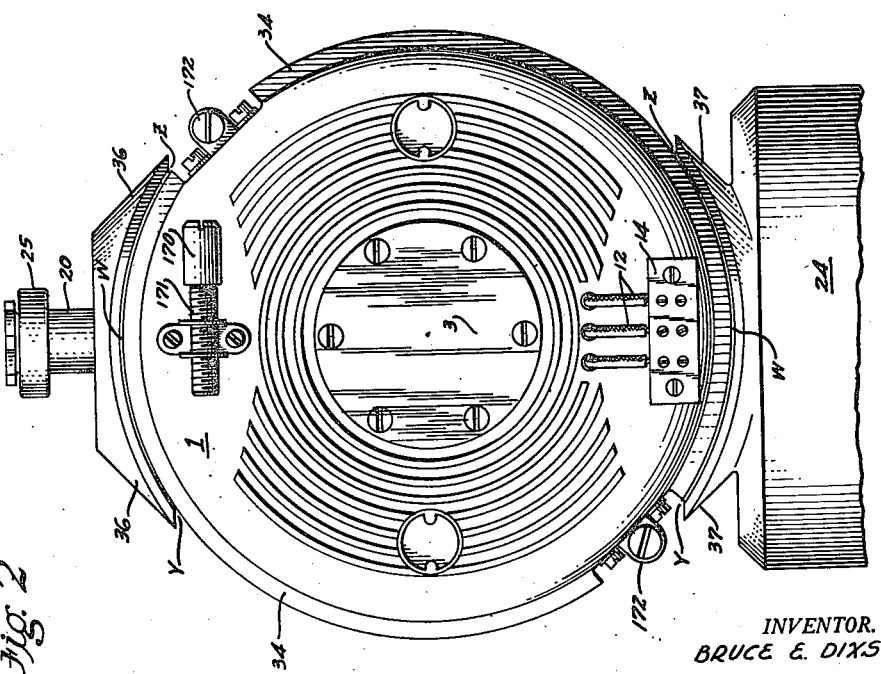
Figure 2 is an end view of the gyro and case shown in Figure 1 taken in the direction of arrow 2.

Referring first to Figures 1 and 2 illustrating the gyro motor and case, a gyro case 1 is provided, generally of cylindrical shape with substantially flat ends, each end supporting a shaft bearing 2 of the ball type, these bearings being held on the case by end caps 3.

Adjacent one end of the case 1 a hollow stub 5 is secured to the case by the use of screws 6 engaging a stub shoulder 7. Stub 5 extends axially through the case 1 to terminate well past the center thereof. Firmly fastened to stub 5 by means of an end ring 9 and shoulder 10 is a motor stator 11 of the type used in induction motors. Leads 12 from the stator are brought out through the case to an exterior connection block 14 on one end of the case 1.

A motor shaft 15 is provided, supported in bearings 2, this shaft extending through the interior of hollow stub 5 but not bearing thereagainst. Shaft 15 is provided with a shaft shoulder 16 to which is firmly attached a hollow gyro mass 17 extending along the case adjacent the interior surface thereof. Between the gyro mass 17 and stator 11, positioned by and fastened to gyro mass 17 is a motor rotor 18. The device so far described is an induction type motor with the rotor outside of the stator. This arrangement is to permit the use of the maximum moment arm of mass 17 within the case 1.

Case 1 is able to revolve on an axis at right angles to the axis of shaft 15, by the provision of a stub shaft 20 attached to a side plate 21 at one side of the case 1, and of a cup stub 22 on the other side of the case, this cup stub 22 being part of a cup 24 secured to the case 1 opposite stub shaft side plate 21, this cup forming the case for a torquer motor used to apply desired torques to the gyro. This torquer motor will be later described.

Case 1 is then rotatable in bearings 25 and 26 engaging stub shaft 20 and cup stub 22 respectively.

Side plate 21 and cup 24 are secured by screws to cylindrical side extensions of case 1, numbered 30 and 31 respectively, these cylindrical extensions being hollow and concentric with stub shaft 20 and cup stub 22. Both the side plate 21 and the base 32 of cup 24 extend outwardly beyond the outer surface of cylindrical extensions 30 and 31.

Outside of cylindrical extensions 30 and 31 the case 1 is provided with fully circular cooling fins 34 positioned in the plane of rotation of the gyro motor. Additional cooling fins 35 are positioned between opposite sets of circular fins 34 (see Figure 4). These additional fins are likewise parallel to the plane of rotation of the gyro motor but are interrupted by the presence of the cylindrical extensions 30 and 31.

Thus at two points W and X (Figure 1), on each side of the gyro case, the side plate 21 and cup base 32 closely approach the circular fins 34. Starting at these two points, the outer periphery of side plate 21 and base 32 gradually curve inward and about the cylindrical case to points Y and Z 90° from points W and X to form lips 36 and 37 respectively, extending to terminate close to the cooling fins 35.

At the end of the gyro or motor shaft 15 carrying the shaft shoulder 16, the adjacent end cap 3 is provided with a case inlet bore 40 coaxial with the axis of shaft 15. This same end of the shaft 15 is provided with a shaft bore 41 extending into the region of shoulder 16. Shaft bore 41 is continued with a plurality of angled shoulder bores 42 opening into an annular interior space 44 between the shoulder 16 and the gyro or motor stator 11. Outside air thus contacts both rotor 18 and stator 11 elements. This air can pass between rotor 18 and stator 11 to the opposite side of these elements to enter an opposite annular space 45 between the end of the rotor and stator elements and the case 1.

As a clearance 46 is required between the rotor or gyro mass 17 and the case 1, air entering the case inlet 40 can pass between the rotor and stator and then around the rotor mass to peripheral points lying close to the axis of case rotation as determined by the coaxial stub shaft 20 and cup stub 22. This air path is shown by arrows.

A plurality of case outlets 50 is provided in the case 1 opposite both the side plate 21 and cup base 32 so that the air can reach spaces 51 and 52 respectively; between side plate 21 and the case, and the cup base 32 and the case, the sides of these spaces being defined by the interior walls of hollow cylindrical extensions 30 and 31. These spaces 51 and 52 function as plenum chambers to equalize the pressure of the cooling air before it is further exhausted to the atmosphere.

A plurality of radial air vents 54, provided in the cylindrical extensions 30 and 31, now directs the air radially outward, equally and symmetrically about the axis of case rotation. The air is then made to follow the inside surfaces of the side plate 21 and cup base 32 to pass through clearances these surfaces make with the cooling fins.

At points near W and X, some of the air passes crosswise over the tops of the completely circular fins 34 to the atmosphere as shown in Figure 1. Any jet effect left in the air at these points is balanced or cancelled out due to the symmetry of air emissions 180° apart, resulting in no torque about the case rotation axis.

At points nearer Y and Z, the air tends to escape by passing under lips 36 and 37 through the channels between adjacent cooling fins 35. Thus any jet effect of air in this direction in addition to being balanced by symmetry, occurs in the plane of rotation of the gyro motor and is of no consequence.

The air is moved through the path as above outlined by the centrifugal effect of the spinning rotor, and passes between the rotor and stator units to provide convective cooling, made effective because of the turbulence induced as a result of the differential speeds of the rotor and stator.

The cooling system as described above is highly effective, and does not produce any spurious torque. No undesirable torque can be generated at the intake 40 because of its central, axial location with respect to the shaft of the gyro motor. The exhaust of the cooling air from the gyro case is first pressure equalized by entrance of this air into the plenum chambers formed by spaces 51 and 52, from which the air escapes over baffled paths all around the case rotational axis, thereby preventing any jet effect which could produce a spurious torque about that axis, and because of opposed exits, torques are balanced.

Figure 3:
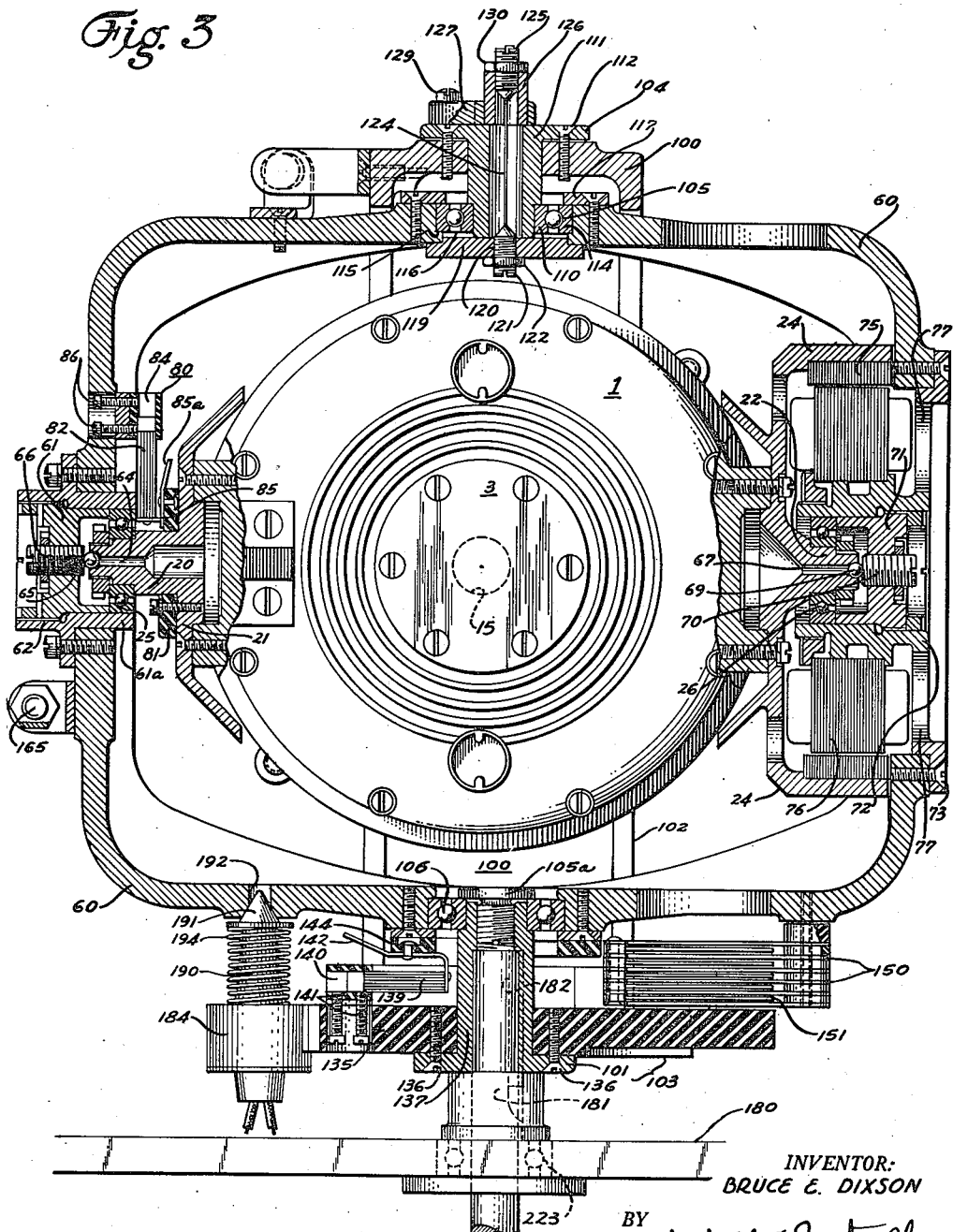
Figure 3 is a view partly in vertical section and partly in elevation of the gyro of Figure 1 as mounted in a gimbal and frame to form a gyro assembly.
Figure 6:
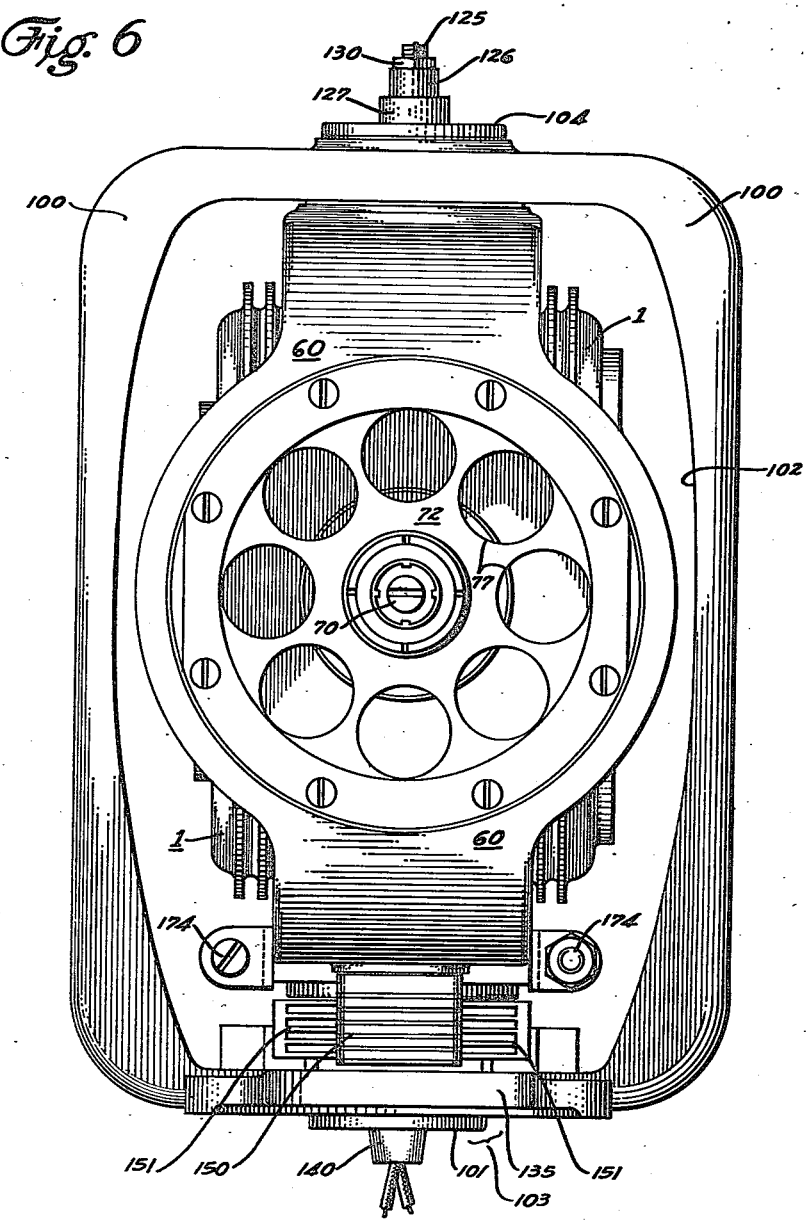
Figure 6 is an elevational view of the torque motor end of the gyro assembly of Figure 3.

Referring next to Figure 3, which shows the mounting of the case 1 inside a gimbal 60, the case bearings 25 and 26 are mounted in gimbal 60 so that the case 1 can revolve on a horizontal axis. As the power leads are brought out across bearing 25, this end of the casing will be called the lead end, as contrasted to the opposite or torquer motor end thereof.

Case bearing 25 is mounted in a retaining cylinder 61a and its outer race is positioned and held therein by an internal sleeve 61 which is fastened in cylinder 61a by threads 62. This retaining cylinder is then fastened to gimbal 60. Case stub shaft 20 is rotatably mounted in case bearing 25 and is prevented from having any end-play by an end-play screw 66 mounted on sleeve 61. Screw 66 bears on a ball 65 held by the chamfer of a bore 64 on the end of the case stub shaft 20. Similarly, on the torquer motor side of the case 1, the cup stub 22 is provided with a ball bore 67 on which an end play ball 69 is held by a screw 70. In this case the bearing 26 is held by a stator frame sleeve 71 attached to a stator frame 72 held on gimbal 60 by frame screws 73. The end play screw 70 is threaded into the end of stator sleeve frame 71. Thus the gyro case 1 is held in gimbal 60 with end play fully under the control of screws 66 and 70, and with end thrust taken by balls 65 and 69.

Cup 24 extends outwardly from case 1 to points closely adjacent the inner surface of gimbal 60 and carries a torquer motor rotor 75 on the inside peripheral surface thereof. The stator 76 of the torquer motor is carried by stator frame 72. Stator frame 72 is outwardly provided with apertures 77 so that the torquer motor may be adequately cooled. The use of the torquer motor will be later described.

Figure 8:
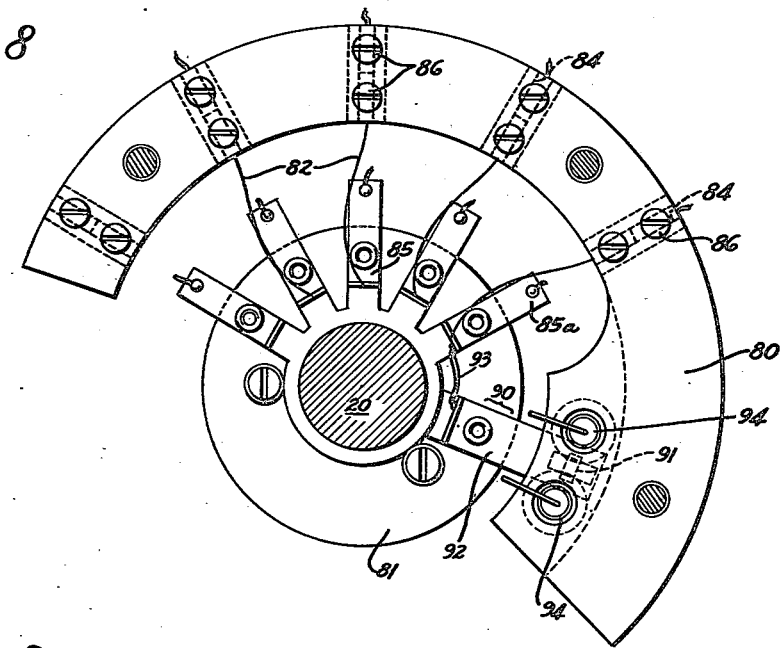
Figure 8 is a plan view of the connection terminals of the flexible leads across the horizontal axis of rotation of the gyro case.
Figure 9:
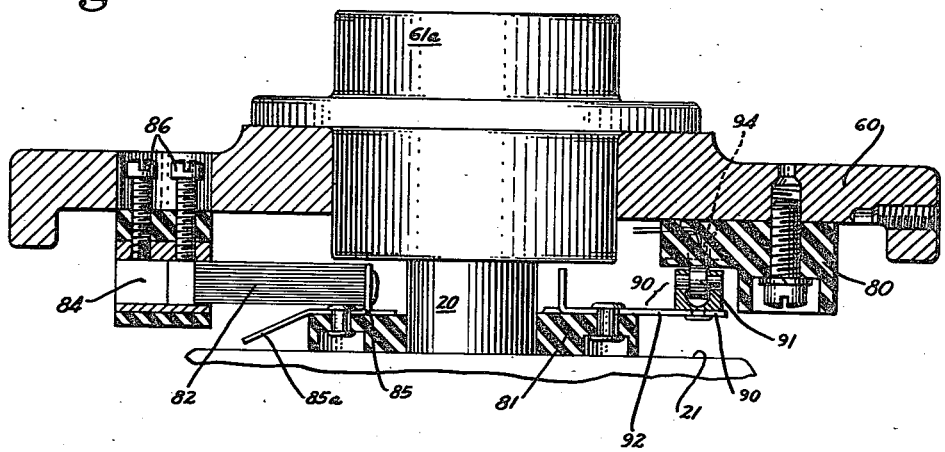
Figure 9 is a view partly in cross section and partly in elevation of the mounting of the connection terminals shown in Figure 8.

On the lead end of case 1 a plurality of flexible leads are provided crossing bearing 25 so that power can be transmitted across this bearing for driving the gyro rotor, shown best in Figures 8 and 9.

Here, an outer connection sector 80 is attached to gimbal 60, an an inner connection ring 81 is attached to gyro case 1. These two connection elements are concentric and coaxial with the axis of rotation of gyro case 1, and are made of insulation material.

Bridging the gap between sector 80 and ring 81 are a plurality of flexible leads 82, only one being shown in Figure 3. However, in the particular device shown, four leads are used bridging bearing 25. Three of these leads are power leads for the gyro motor and one of these leads is for a case position contact, described later.

As all of the flexible leads are alike, only one will be described. The lead itself is composed of a plurality of fine wires, preferably copper, inserted at each end thereof into terminals so that these wires are close together, parallel, and coplanar when extended to their full length.

The wires at one end are inserted into a terminal block 84 and soldered. In case enameled copper wire is used, as is preferred, the enamel is removed only in the solder area. The wires are then placed under a slight uniform tension and passed through a second slot in a clip 85, bent 90°, and soldered to the back of the clip.

The clips 85 are riveted to the ring 81, and the ends 85a of the clips opposite the wire insertions will serve as connectors to which wires to the motor etc., can be soldered. For clarity of illustration, connection wires over the case 1 have been omitted.

The terminal blocks 84 are then inserted in sector 80 and held in place by terminal screws 86. Preferably terminal blocks 84 are provided with soldering lugs for connection of wires supported on gimbal 60, which wires are not shown.

When the terminal blocks 84 are mounted in the sector 80, the blocks 84 are positioned to be in the same radial line as the clips 85 at a predetermined gyro position, so that if the wires of the lead 82 were to be extended to their full length, they would be in a radial line. However, before the terminal blocks 84 are tightened in place, they are moved inwardly to place a slight bow in the wires. This bowing permits relative movement of the sector and ring over a relatively large arc without tensioning the wires of the lead. Departure of the gyro case from its predetermined position with respect to the gimbal is sensed by a case position contact 90 (mentioned above) comprising a roller 91 attached to a ring arm 92, which in turn extends radially from connector ring 81. At the predetermined gyro position the roller is between two sector contacts 94, and rotation of the gyro case on its bearings 25 and 26 will cause one or the other of the sector contacts 94 to be electrically connected to the roller 91. One of the flexible lead clips 85 is connected to the ring arm 92 by wire 93 so that all three contacts of the gyro case position indicator as just above described are brought out to the gimbal, as contacts 94 rotate with the gimbal.

As a specific example of a flexible lead that has proved satisfactory in gyro service, a lead comprising twelve No. 44 (.00198 in. diam.) enamelled soft copper wires has been found to provide satisfactory current carrying capacity for a gyro motor 4 inches in diameter, and to provide negligible torque even when a plurality thereof are used across bearing 25.

Returning to Figures 3-7 inclusive, the gimbal 60 is mounted in an outer gimbal or follower frame 100 supported from a follower platform base 101 and extending around gimbal 60. This frame 100 comprises side arms 102 extending first outwardly then upwardly and then inwardly to be joined at a center plate 104.

The gyro gimbal 60 is supported by the follower frame 100 and is held in position laterally by an upper and lower ball bearing 105 and 106 so that the gimbal 60 and the gyro case mounted thereon are free to rotate around a vertical axis.

In order that all spurious torques that are the result of bearing friction about the vertical axis be reduced to a tolerable minimum for a precision gyro assembly, the weight of the gimbal 60, case 1 and enclosed gyro motor is transmitted to the follower frame 100 through a fine wire, thus relieving bearings 105 and 106 of any thrust load due to the weight of the suspended members.

The wire suspension is shown in detail in Figure 3. Here the inner race 110 of upper bearing 105 is attached to a hollow member 111 forming a downwardly extending portion of center plate 104 which is attached to the frame 100 by screws 112. The outer race 114 of the bearing 105 is set against a lower shoulder 115 around an aperture 116 in the gimbal 60 and is held in place by retaining ring 117.

Just below bearing 105 is positioned a tension plate 119 having a central bore 120 in which a lower tension screw 121 is threaded, this screw having a lock nut 122 thereon. The upper surface of this screw 121 is coned, and a tension wire 124 is inserted into the apex of the cone to extend upwardly through hollow member 111. Tension wire 124 terminates in an upper tension screw 125 set into upper tension lug 126 attached to an adjustment plate 127 which is secured to the top of center plate 104 by lock screw 129. Upper adjustment screw 125 is also provided with a lock nut 130. Tension wire 124 can be centered by movement of adjustment plate 127 with respect to center plate 104; the vertical position of gimbal 60 can be controlled by turning adjustment screws 121 or 125 a sufficient amount to take all weight off bearings 105 and 106; and the normal neutral azimuthal position of case 1 in the horizontal plane can be controlled by small rotations of screws 121 or 125.

In operation, after all weight is removed from the bearings 105 and 106, the small lack of correspondence which will occur between the follower frame position and the inner gimbal position (directional error) before corrective control is provided will be absorbed by torsion in the wire 124 which, because the wire is small, is not of critical importance. In this way bearing friction around the vertical axis of the gimbal 60 is greatly reduced. The suspension as described, when used in a precision gyro has been highly satisfactory in contributing to the accomplishment of the drift rate of less than 1° per hour mentioned above.

At the bottom of the gyro assembly, between the follower platform base 101 and the gimbal 60, a connection plate 135 of insulating material is held on base 101 by screws 136. A hollow main support sleeve 137 is erected from follower platform base 101, and lower bearing 106 is attached to the top of this sleeve by screw 105a. Nine flexible leads 139, similar in all respects to those previously described as crossing bearing 25 at the lead end of case 1, have one terminal 140 thereof mounted on the connection plate 135 by screws 141, the other ends of the wires being attached to gimbal clips 142 mounted on a gimbal ring 144 of insulating material. The arrangement of parts 135, 139, and 144 is substantially the same as shown in Figures 8 and 9 for the case bearing leads, except that nine leads are used.

These leads (only one of which is shown in Figure 3) comprise three leads for the gyro motor, three leads for the torquer motor, and three leads for the case position sensing device 92, 91, and 94. Wires to the respective devices mentioned are run along the gimbal and are not shown.

In order that the relative motion of the gimbal 60 with relation to the follower platform base 101 can be sensed, a purely capacitative pickoff is utilized which cannot introduce any significant torque to the gyro during the sensing operation. A stack of rotor blades 150 are attached to the lower position of gimbal 60. This stack extends downwardly with the blades 150 horizontal, and a pair of spaced stacks of stator blades 151 are mounted on connection plate 135 with the rotor blades 150 only barely interleaving both stacks of stator blades 151 at the neutral position of the gimbal 60. Rotation of the gimbal will thus increase the capacity of one or the other stacks of stator blades. This change of capacity is then used to cause an unbalance in a capacity bridge circuit resulting in an appropriate signal which may be used to slave the base 101 and the connection plate 135 which comprise the supporting platform 103 to the null directional position referenced by the gyro, as will be later brought out.

As shown in Figures 4, 5 and 7 the maximum permissible rotation of case 1 with respect to gimbal 60 is limited to about 20° by the use of a case stop arm 160 extended outwardly from case 1 between two adjustable gimbal stops 161 attached to a stop frame 162 secured to the gimbal 60 adjacent the lead end of case 1.

Also mounted on gimbal 60 adjacent the lead end of case 1 and on the outside of the gimbal, is an adjustable gimbal balancing weight 164 mounted to be moved laterally on screw 165, as best shown in Figure 5.

The motion of the gimbal 60 with respect to follower frame 100 is also limited by a frame arm 166 attached to the top of the frame 100, and extending between two adjustable stops 167 mounted on gimbal 60 by means of frame 169. This limits rotation of gimbal 60 in main frame 100 to an angle of about 15°, as shown in Figures 5 and 4.

As best shown in Figure 2, the gyro case is balanced by the use of an end weight 170 mounted on a screw 171 extending to cross the axis of case rotation. In addition, diametrically opposite side weights 172 are positioned on the case 1 for balancing around the case axis. Adjustable balancing weights assemblies 174 (Figure 6) are also positioned on gimbal 60 near and on each side of lower bearing 106.

As it is desirable that the gyro assembly as above described be mounted on a horizontally stabilized platform, this platform 180 as shown in Figure 3 carries a heavy stud 181 entering hollow support sleeve 137 at the gyro supporting platform 103, this stud 181 being provided with a key 182 to lock stud and sleeve together. Platform 180 may be horizontally stabilized by any well known means and as such a stabilizing device is no part of the present invention it will not be described herein.

Stud 181 projects below horizontally stabilized platform 180, with the rotor of the platform torquer motor 215 attached to stud 181, the stator thereof being attached to stabilized platform 180. Stud 181 is projected through motor 215, and the rotor of position transmitter 236 is also attached thereto, the stator being attached to stabilized platform 180. Thus, platform torquer motor 215 will turn supporting platform 103 with respect to horizontally stabilized platform 180, and position transmitter 236 will transmit to a remote indicator or control, the relative angular position of the two platforms.

The embodiment of the invention herein disclosed has two operating modes that will be referred to herein as the uncaged and the caged conditions, thereby permitting free and monitored conditions, respectively, of the gyro.

As one mode of operation of the gyro assembly as above described requires that the gimbal 60 be caged to the follower platform base and thus to the supporting platform 103, the solenoid 184 is provided with a plunger 190 extending upwardly to terminate in a coned end 191 fitting into a locking bore 192 in the gimbal 60 when the gyro is in neutral position directionally. The application of current to the solenoid 184 withdraws the coned end 191 of the plunger 190 from bore 192 and changes the gyro from a caged gyro to a free gyro. A spring 194 insures relocking after current in solenoid 184 ceases.

It is assumed that the gyro hereinbefore described is to be used as a directional reference in a guided missile, which is, for the purposes of this discussion, completely and automatically guided from a remote control reference. It is also assumed that the remote control reference may become ineffective during certain periods of the flight of the missile, for example.

Accordingly, the monitoring device might be a flux gate or flux valve operated by the earth's magnetic field to control the gyro to indicate north. In this case it is possible that in passing through or close to northernmost latitudes the flux valve response may become inaccurate to the extent that guidance by a free gyro is more desirable.

If again, for example, the monitor is a directional radio or radar beam, interfering signals, fading, or distance may render the radio or radar signals incapable of controlling the gyro correctly. In this case a shift to a free gyro is clearly in order.

When celestial navigation devices, such as star tracking telescopes, are to be used to monitor the gyro, such tracking may well be deferred until the missile reaches a stable altitude and direction on its trajectory. Further, in cases of long flights, it may be desirable to shift the tracking telescopes from one set of reference stars to another, due to a change of position of the first reference stars from a favorable to an unfavorable position in the sky. In such cases it will be desirable to have the gyro operate as a free gyro when monitoring conditions are unfavorable, and furthermore to have the gyro return to monitored condition if and when favorable monitoring conditions are reestablished.

For the sake of simplicity of explanation, the present invention will be described as including a directional radio or radar reference beam receiver, with the caging or uncaging device operating in accordance with the reception of signals of proper or improper quality. However, it will be distinctly understood that it is not desired to be limited to the use of any particular monitoring device and that the switch from caged to uncaged conditions may be accomplished for any reason whatever serving to protect the missile from substantial change in direction due to temporary or permanent loss of monitoring signals from any cause.

In the uncaged condition, the spin axis of the gyro is free in inertial space and the gyro thus functions as a free gyro to provide a directional reference for the supporting platform 103.

The signalling means by which the directional position of the supporting platform 103 is known with respect to the gyro spin axis free in inertial space, is provided by the capacitance pickoff assemblies and the associated circuitry as shown in the diagram of Figure 10. The capacitance assembly forms a ganged capacitor which cannot introduce any signficant torques to the gyro. The two stator halves 151 of the gang capacitance which are effectively attached to the supporting platform 103 are interconnected with external fixed capacitors 200 and 201 to form a bridge network. In order to make the bridge properly operative, the size of the capacitors is such that the ratio of the capacitance formed by one stator half to the other stator half at the desired null position of the supporting platform is equal to the ratio of capacitance of the external capacitor 200 to capacitor 201. A crystal oscillator 202 tuned to a high frequency, for instance, to approximately 1 mc. is connected diagonally across the bridge at the terminals connecting each half 151 of the gang capacitor stator to one of the external capacitors 200 and 201. Another output lead 204 from the crystal oscillator 202 carries the tuned fixed frequency to fixed frequency amplifier 205 where it is amplified and then fed into a standard ring demodulator 206 by wire 207.

Across the other two terminals of the capacity bridge network the output signal circuitry is connected. One of these terminals, the capacitor rotor 150 is connected to ground, the other terminal, the connection between capacitors 200 and 201, is connected to signal amplifier 209 whose output in turn then led to the ring demodulator 206.

With the two stator halves 151 of the gang capacitor attached to the gimbal 60 and the common rotor 150 attached to the supporting platform 103, any directional deviation between the established spin axis of the gyro and the supporting platform 103 results in an unbalance in the capacitance of the bridge circuit and results in a signal to the signal amplifier 209. Depending on which of the two halves 151 of the gang capacitor has the greater effective area, the output A. C. signals has a fixed phase relationship with respect to the crystal oscillator frequency, so that it is either in phase, or 180° out of phase with this frequency.

The ring demodulator 206, which is a conventional circuit and is shown blocked, since its details are not a part of the present invention, converts this high frequency signal into a D. C. output. The sense of the D. C. output, appearing in demodulator output leads 211, is a function of the phase lead or lag signal from the bridge.

An inverter 212 converts and amplifies this D. C. voltage output to a 60 cycle voltage, which is also the frequency of a reference frequency line 214. The 90° phase lead or lag relation of the inverter output to this reference frequency is determined by the sense of the D. C. voltage input of the inverter. This 60 cycle voltage is then properly impressed on the control field of a platform torque motor 215, connected to rotate supporting platform 103. The reference field of the torque motor 215 is energized by the reference frequency in reference frequency line 214. A normally open solenoid switch A is positioned between inverter 212 and the control field of platform torque motor 215. Thus the unbalance in the capacitance of the bridge circuit results in an appropriate signal which is used to slave the supporting platform 103 to the null directional position referenced by the gyro in its free state.

In the caged condition of the gyro of the present invention, the caging solenoid 140 is used to lock the gimbal 60 against rotation about the vertical axis with respect to the supporting platform. Thus the spin axis of the gyro is directionally caged directly to the supporting platform and can no longer function as a free directional gyro. It is to be noted however, that the case 1 is still free to rotate on its horizontal axis.

For the caged condition of the gyro, the supporting platform receives control signals from an appropriate slaving system. For this embodiment of the invention, the torquer motor 75—76 converts the control signal received from a directional radio receiver 220 into an applied torque about the horizontal axis of the case thus utilizing the precessional properties of the gyro to maintain directional stability and control of the platform 103 on which the directional gyro assembly is mounted.

The directional radio receiver 220 may be of conventional type as shown in Figure 10, receiving signals on a directional antenna L, and also on a non-directional antenna ND. Receiver 220 has a directional output line 220a, and a non-directional outpu line 220b, and is mounted on the supporting platform 103 on which the gyro assembly is mounted, so that it normally maintains a horizontal position. The directional receiver senses its azimuth orientation with respect to the direction of the controlling radio beam and transmits this information through directional output line 220a, transformer 221 and amplifier 222 to the torquer motor 75—76 which then functions as a precessing device for the gyro, with the position of the spin axis, with respect to the direction as received, under the control of a null angle adjustment 224.

When in the caged condition, the gyro functions as a means for giving directional stability to the supporting platform. In rough weather, the radio receiver may continually oscillate out of the beam directional line and the signals resulting from these spurious short period fluctuations, if used directly, would be useless for direction indications. Because of the inherent rigidity of the gyro, however, the platform reacts at a very slow rate to these spurious signals and effectively integrates the short time fluctuations so that only the desired directional indications are produced. Hence only long period directional indications from the directional receiver result in a precessing of the gyro and the rotation of supporting platform 103, caged thereto, about the vertical axis on which the platform may rotate.

It is to be understood however, that the precessional torques applied by the torquer motor 75—76 do not actually rotate the spin axis of the gyro in the vertical plane, but are sufficient to cause the gyro to rotate the supporting platform on its vertical axis, a well known characteristic reaction of a gyroscope.

However, the weight of the supporting platform and all that is mounted thereon necessarily is imposed on the bearings 223 on which the supporting platform is mounted to rotate on a vertical axis. The resultant frictional torque opposes the effort of the gyro to rotate the platform, and this opposition to rotation of the platform by the gyro will actually, by the principle of precession, rotate the spin axis of the gyro in a vertical plane. If this should happen the accuracy of the gyro would suffer, as the precessional torques applied by the gyro torquer motor would not precess the gyro in the same manner as when the spin axis is exactly horizontal. As the spin axis of the gyro is free to rotate in a vertical plane, i. e., the case is always free to rotate on its horizontal axis, rotation of the spin axis in the vertical plane due to frictional torque in the platform bearing is instantly sensed by the use of case position contact 90 making an electrical connection to one or the other of sector contacts 94.

One contact 94 is supplied by lag phased power from the 60 cycle reference line 214 through a lagging network 230 and the other contact 94 is supplied with lead phased power from a leading network 231. The lead or lag phased power is taken from contacts 94 by roller 91 moved by case 1, passed back to the gimbal by one of the flexible leads 82, and led through normally closed solenoid switch B to the control field of the platform torque motor 215. The normally open solenoid 184 is under the contorl of a solenoid switch C so that the gyro can be caged or uncaged as desired, and a normally closed torquer solenoid switch D is placed in the common line between amplifier 222 and the torquer motor 75—76.

Thus, when solenoid switches A and C are closed, with switches B and D open, the gyro is operating as an unmonitored free gyro to control the direction of supporting platform 103. Conversely, when switches B and D are closed with switches A and C opened the gyro gimbal is caged to the platform and the monitor controls the gyro to control the direction of platform 103.

In order that the shift from caged to uncaged conditions or vice versa, may be made automatically, in the presently described example the directional radio receiver 220 is also used to feed a signal quality responder 235, which can be adjusted to operate solenoid switches A, B, C, and D, in the proper manner to shift the gyro to a free condition. This operation would be desired, for example, when signal quality drops below a predetermined value necessary to properly operate torquer motor 75—76.

Solenoid switches A and C are sprung to remain normally open in the absence of current control, whereas solenoids B and D are sprung to be normally closed in the absence of energization. Thus, under normal conditions gimbal 60 is locked to frame 100 and the gyro is in condition to be monitored. This circuit condition is shown in Figure 10.

The quality responder 235 used to operate solenoid switches A, B, C and D may be of several different types, all well known in the art. One of the simplest is a signal amplitude responder as shown in Figure 11. Here, an audio output tube 300 receives the non-directional signal through non-directional output line 220b. Tube 300 is biased to be conducting when a non-direction signal of a proper amplitude is being received, thereby holding a relay 301 open. Upon amplitude deterioration of the signal, as by fading for example, the tube 300 becomes non-conducting, relay 301 closes by virtue of relay spring 302 and solenoid switches A, B, C and D are actuated by a battery 303 to unlock gimbal 60 from frame 100, disconnect the torquer motor 75—76 from the monitoring control, open the precession control line from roller 91, and connect the capacitance pickoff and associated circuits to platform torquer motor 215. Upon re-establishment of proper signal amplitude, relay 301 is opened, solenoid switches A, B, C and D return to their original positions, and the gyro is again caged for directional monitoring. A satisfactory relay circuit of this type is shown in Figure 8 on page 17 of the book, "Electronic Equipment" by R. C. Walker, Chemical Publishing Co., Brooklyn, New York, 1945.

A signal-to-noise ratio circuit can also be used as the signal quality responder 235. A satisfactory circuit of this type is shown for example in Figure 7 of the U. S. Patent to Noble, No. 2,459,675, issued January 18, 1949. The pertinent portion of Noble's Figure 7 is reproduced herein as Figure 12, the only difference being that the output of the circuit is used to operate solenoid switches A, B, C and D of Figure 10 herein, instead of opening and closing a loud-speaker circuit as shown by Noble.

Referring to Figure 12, the non-directional output line 220b from receiver 220 (Figure 10) is led to a signal amplitude limiter 320 feeding a detector 321, and a battery 322 is provided in place of Noble's amplifier. Battery 322 is connectable to solenoid switches A, B, C and D through a stationary contact 323 and a relay arm 324. The detector 321 feeds a noise amplifier and filter 325, the output of which is rectified by rectifier 326. The rectified output of rectifier 326 is applied across a resistance 327. A resistance 328 is connected across limiter 320 and is connected in series with resistance 327, in voltage opposition.

A D. C. amplifier tube 330 with a grid 331 connected to the positive end of resistor 327 is provided, and a relay coil 332 is connected to the tube 330, to operate the relay arm 324 as a switch arm for the contact 323, to connect and disconnect the control lines to solenoid switches A, B, C and D from battery 322.

When a clear signal is being received, the voltage balance across resistances 327 and 328 is such as to make tube 330 substantially non-conducting. Relay arm 324 is thus pulled away from stationary contact 323, by a relay spring 333, and the solenoid switches will be in their normal positions so that the gyro will be caged, and under monitoring control by directional signals from receiver 220.

When noise predominates, however, the positive potential on resistor 327 acting through grid 331 raises the output of tube 330 to energize relay coil 332, thereby drawing arm 324 against contact 323 to energize solenoid switches A, B, C and D from battery 322, thereby shifting the gyro from caged to free condition.

Thus it will be seen that in either case the gyro is normally monitored, but the gimbal will be unlocked from the frame for free operation upon signal deterioration. The Noble type of circuit, above referred to, is particularly applicable when automatic gain control is incorporated in receiver 220. The output of other monitoring systems than mentioned herein can control the solenoids A, B, C and D in the same manner.

It is to be noted that when the gyro is free, i, e, when gimbal 60 is not caged to the main frame 100, the only frictional torque around a vertical axis that can precess the gyro is the friction in the bearings, 105 and 106 between the gimbal and the main frame. The importance of reducing this torque to the minimum by the suspension of the gimbal, case and motor in wire 124 can therefore be appreciated.

It will also be noted that because of the low drift rate of the gyro when free, which is as stated above less than 1 degree per hour, the corrective forces operating on the gyro when it is again caged to be placed under the control of the monitor will not be great, as the supporting platform will be within 1° of the monitored direction after an uncaged run of one hour. Also, no difficulty will occur in accurately recaging the gimbal 60 to frame 100, as in the uncaged condition the supporting platform is moved to follow up the direction of the gyro axis, and the only deviation that might occur would result from the bearing frictional torque about the gimbal vertical axis, which as pointed out above has completely minimized by the use of the wire suspension.

It will therefore be seen from the above that the supporting platform 103 will indicate direction within the missile as established by the monitor. In order that this direction be available as a signal, the position of supporting platform 103 with respect to the body of the missile is sensed by a platform position transmitter 236 whose output can then be utilized in conjunction with other navigational equipment to guide the missile.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A directional gyro assembly comprising a platform adapted to be stabilized in a horizontal plane and mounted for vertical rotation, a main frame mounted on said platform and extending upwardly therefrom, a gimbal mounted to rotate on a vertical axis on said frame, a gyro case mounted to rotate on a horizontal axis on said gimbal, a gyro rotor in said gyro case having a horizontal spin axis at right angles to the axis of rotation of said case, means for driving said rotor and means operable to lock and unlock said gimbal to said frame in a predetermined relation, means for sensing relative movement away from said predetermined relation of said gimbal and said frame, a motor connected to rotate said platform and said frame, and means for simultaneously unlocking said gimbal from said frame and connecting said sensing means to control said motor, whereby the predetermined locked relation of gimbal and frame will be maintained after unlocking has occurred.

2. A directional gyro assembly comprising a platform adapted to be stabilized in a horizontal plane and mounted for vertical rotation, a main frame mounted on said platform and extending upwardly therefrom, a gimbal mounted to rotate on a vertical axis on said frame, a gyro case mounted to rotate on a horizontal axis on said gimbal, a gyro rotor in said gyro case having a horizontal spin axis at right angles to the axis of rotation of said case, means for driving said rotor, means for caging said gimbal to said frame, and a torquer motor for applying a torque to said case tending to turn said case on its horizontal axis.

3. A directional gyro assembly comprising a platform adapted to be stabilized in a horizontal plane and mounted for vertical rotation, a main frame mounted on said platform and extending upwardly therefrom, a gimbal mounted to rotate on a vertical axis on said frame, a gyro case mounted to rotate on a horizontal axis on said gimbal, a gyro rotor in said gyro case having a horizontal spin axis at right angles to the axis of rotation of said case, means for driving said rotor, means for caging said gimbal to said frame, a torquer motor for applying a torque to said case tending to turn said case on its horizontal axis, and means for sensing the rotation of said case on its horizontal axis.

4. A directional gyro assembly comprising a platform adapted to be stabilized in a horizontal plane and mounted for vertical rotation, a main frame mounted on said platform and extending upwardly therefrom, a gimbal mounted to rotate on a vertical axis on said frame, a gyro case mounted to rotate on a horizontal axis on said gimbal, a gyro rotor in said gyro case having a horizontal spin axis at right angles to the axis of rotation of said case, means for driving said rotor, means for caging said gimbal to said frame, a torquer motor for applying a torque to said case tending to turn said case on its horizontal axis, means for sensing the rotation of said case on its horizontal axis, and means for rotating said platform on its vertical axis.

5. A directional gyro assembly comprising a platform adapted to be stabilized in a horizontal plane and mounted for vertical rotation, a main frame mounted on said platform and extending upwardly therefrom, a gimbal mounted to rotate on a vertical axis on said frame, a gyro case mounted to rotate on a horizontal axis on said gimbal, a gyro rotor in said gyro case having a horizontal spin axis at right angles to the axis of rotation of said case, means for driving said rotor, means for caging said gimbal to said frame, a torquer motor for applying a torque to said case tending to turn said case on its horizontal axis, means for sensing the rotation of said case on its horizontal axis, and means for indicating the angle of rotation of said platform.

6. A directional gyro assembly comprising a platform adapted to be stabilized in a horizontal plane and mounted for vertical rotation, a main frame mounted on said platform and extending upwardly therefrom, a gimbal mounted to rotate on a vertical axis on said frame, a gyro case mounted to rotate on a horizontal axis on said gimbal, a gyro rotor in said gyro case having a horizontal spin axis at right angles to the axis of rotation of said case, means for driving said rotor, means for caging said gimbal to said frame, a torquer motor for applying a torque tending to turn said case on its horizontal axis to cause said gyro to rotate said platform by precessional reaction, means for sensing the rotation of said case on its horizontal axis because of precession due to frictional resistance of said platform to rotation by said gyro, means for rotating said platform on its vertical axis in accordance with the rotation sensed by said sensing means to maintain said spin axis substantially horizontal during the application of torque to said case by said torquer motor, and means for indicating the angle of rotation of said platform.

7. A directional gyro assembly comprising a platform adapted to be stabilized in a horizontal plane and mounted for vertical rotation, a main frame mounted on said platform and extending upwardly therefrom, a gimbal mounted normally to rotate on a vertical axis on said frame, a gyro case mounted to rotate on a horizontal axis on said gimbal, a gyro rotor in said gyro case having a horizontal spin axis at right angles to the axis of rotation of said case, means for driving said rotor, means acting when energized to cage said gimbal to said frame, a torquer motor for applying when energized a torque tending to turn said case on its horizontal axis to cause said gyro to rotate said platform by precessional reaction, means acting to sense the rotation of said case on its horizontal axis because of gyro precession due to frictional resistance of said platform when rotated by said gyro, power means controllable to rotate said platform on its vertical axis, and control means to simultaneously energize said caging means and said torquer motor, and to connect said sensing means to control said power means.

8. A directional gyro assembly comprising a platform adapted to be stabilized in a horizontal plane and mounted for vertical rotation, a main frame mounted on said platform and extending upwardly therefrom, a gimbal mounted normally to rotate on a vertical axis on said frame, a gyro case mounted to rotate on a horizontal axis on said gimbal, a gyro rotor in said gyro case having a horizontal spin axis at right angles to the axis of rotation of said case, means for driving said rotor, means acting when energized to cage said gimbal to said frame, a torquer motor for applying when energized a torque tending to turn said case on its horizontal axis to cause said gyro to rotate said platform by precessional reaction, means acting when energized to sense the rotation of said case on its horizontal axis because of gyro precession due to frictional resistance of said platform when rotated by said gyro, power means controllable to rotate said platform on its vertical axis, and control means to simultaneously energize said caging means and said torquer motor, and to connect said sensing means to control said power means, and means for indicating the angle of rotation of said platform.

9. A directional gyro assembly comprising a platform adapted to be stabilized in a horizontal plane and mounted for vertical rotation, a main frame mounted on said platform and extending upwardly therefrom, a gimbal mounted to rotate on a vertical axis on said frame, a gyro case mounted to rotate on a horizontal axis on said gimbal, a gyro rotor in said gyro case having a horizontal spin axis at right angles to the axis of rotation of said case, means for driving said rotor, means normally locking said gimbal to said frame in a predetermined relation, to a torquer motor for applying a torque tending to turn said case on its horizontal axis to cause said gyro to rotate said platform by precessional reaction, a first sensing means acting to sense the rotation of said case on its horizontal axis because of gyro precession due to frictional resistance of said platform when rotated by said gyro, controllable power means connected to rotate said platform on its vertical axis in accordance with the rotation sensed by said first sensing means, a second sensing means operable to sense departure of said gimbal and said frame from said predetermined relation, and control means operable to simultaneously unlock said gimbal from said frame, de-energize said torquer motor and to transfer the control of said power means from the connection to said first sensing means to a connection to said second sensing means to cause said power means to substantially maintain said predetermined relation of frame and gimbal in the absence of lock.

10. A directional gyro assembly comprising a platform adapted to be stabilized in a horizontal plane and mounted for vertical rotation, a main frame mounted on said platform and extending upwardly therefrom, a gimbal mounted to rotate on a vertical axis on said frame, a gyro case mounted to rotate on a horizontal axis on said gimbal, a gyro rotor in said gyro case having a horizontal spin axis at right angles to the axis of rotation of said case, means for driving said rotor, means normally locking said gimbal to said frame in a predetermined relation, a torquer motor for applying a torque tending to turn said case on its horizontal axis to cause said gyro to rotate said platform by precessional reaction, a first sensing means acting to sense the rotation of said case on its horizontal axis because of gyro precession due to frictional resistance of said platform when rotated by said gyro, controllable power means connected to rotate said platform on its vertical axis in accordance with the rotation sensed by said first sensing means, a second sensing means operable to sense departure of said gimbal and said frame from said predetermined relation, and control means operable to simultaneously unlock said gimbal from said frame, deenergize said torquer motor and to transfer the control of said power means from the connection to said first sensing means to a connection to said second sensing means to cause said power means to substantially maintain said predetermined relation of frame and gimbal in the absence of lock, said control means also being reversely operable to restore original conditions.

11. A directional gyro assembly comprising a platform adapted to be stabilized in a horizontal plane and mounted for vertical rotation, a main frame mounted on said platform and extending upwardly therefrom, a gimbal mounted to rotate on a vertical axis on said frame, a gyro case mounted to rotate on a horizontal axis on said gimbal, a gyro rotor in said gyro case having a horizontal spin axis at right angles to the axis of rotation of said case, means for driving said rotor, means normally locking said gimbal to said frame in a predetermined relation, a torquer motor for applying a torque tending to turn said case on its horizontal axis to cause said gyro to rotate said platform by precessional reaction, a first sensing means acting to sense the rotation of said case on its horizontal axis because of gyro precession due to frictional resistance of said platform when rotated by said gyro, controllable power means connected to rotate said platform on its vertical axis in accordance with the rotation sensed by said first sensing means, a second sensing means operable when energized to sense departure of said gimbal and said frame from said predetermined relation, and control means operable to simultaneously unlock said gimbal from said frame, de-energize said torquer motor, and to transfer the control of said power means from the connection to said first sensing means to a connection to said second sensing means to cause said power means to substantially maintain said predetermined relation of frame and gimbal in the absence of lock, and means for indicating the angle of rotation of said platform.

12. A directional gyro assembly comprising a platform adapted to be stabilized in a horizontal plane and mounted for vertical rotation, a main frame mounted on said platform and extending upwardly therefrom, a gimbal mounted to rotate on a vertical axis on said frame, a gyro case mounted to rotate on a horizontal axis on said gimbal, a gyro rotor in said gyro case having a horizontal spin axis at right angles to the axis of rotation of said case, means for driving said rotor, means normally locking said gimbal to said frame in a predetermined relation, a torquer motor for applying a torque tending to turn said case on its horizontal axis to cause said gyro to rotate said platform by precessional reaction, a first sensing means acting to sense the rotation of said case on its horizontal axis because of gyro precession due to frictional resistance of said platform when rotated by said gyro, controllable power means connected to rotate said platform on its vertical axis in accordance with the rotation sensed by said first sensing means, a second sensing means operable to sense departure of said gimbal and said frame from said predetermined relation, control means operable to simultaneously unlock said gimbal from said frame, de-energize said torquer motor, and to transfer the control of said power means from the connection to said first sensing means to a connection to said second sensing means to cause said power means to substantially maintain said predetermined relation of frame and gimbal, means for receiving a directional signal from an energy source of known position, means for applying said directional signal to actuate said torquer motor, a received signal quality measuring device, means connecting said received signal quality device to operate said control means thereby placing said platform solely under control of the freed gyro, at a predetermined minimum signal quality value, and means for indicating the angle of rotation of said platform.

13. A gyro assembly in accordance with claim 12 wherein said signal quality measuring device is a signal amplitude measuring device.

14. A directional gyro assembly comprising a platform adapted to be stabilized in a horizontal plane and mounted for vertical rotation, a main frame mounted on said platform and extending upwardly therefrom, a gimbal mounted to rotate on a vertical axis on said frame, a gyro case mounted to rotate on a horizontal axis on said gimbal, a gyro rotor in said gyro case having a horizontal spin axis at right angles to the axis of rotation of said case, means for driving said rotor, means normally locking said gimbal to said frame in a predetermined relation, a torquer motor for applying a torque tending to turn said case on its horizontal axis to cause said gyro to rotate said platform by precessional reaction, a first sensing means acting to sense the rotation of said case on its horizontal axis because of gyro precession due to frictional resistance of said platform when rotated by said gyro, controllable power means connected to rotate said platform on its vertical axis in accordance with the rotation sensed by said first sensing means, a second sensing means operable to sense departure of said gimbal and said frame from said predetermined relation, control means operable to simultaneously unlock said gimbal from said frame, de-energize said torquer motor, and to transfer the control of said power means from the connection to said first sensing means to a connection to said second sensing means to cause the latter to substantially maintain said predetermined relation of frame and gimbal in the absence of lock, said control means being reversely operable to restore original conditions, means for receiving a directional signal from an energy source of known position, means for applying said directional signal to actuate said torquer motor, a received signal quality measuring device, means connecting said received signal quality device to operate said control means to unlock said gimbal from said frame when said signal quality deteriorates to a value below a predetermined value thereby placing said platform solely under the control of the freed gyro, and to operate said control means reversely to restore original conditions when said signal quality rises to a value above said predetermined value, and means for indicating the angle of rotation of said platform.

15. A gyro assembly in accordance with claim 14 wherein said signal quality measuring device is a signal amplitude measuring device.

References Cited in the file of this patent

UNITED STATES PATENTS

| | | |
|---|---|---|
| 1,773,411 | Thompson | Aug. 19, 1930 |
| 2,200,431 | Rateau | May 14, 1940 |
| 2,220,055 | Fischel et al. | Oct. 29, 1940 |
| 2,357,319 | Esval et al. | Sept. 5, 1944 |
| 2,363,401 | Crane et al. | Nov. 21, 1944 |
| 2,459,675 | Noble | Jan. 18, 1949 |
| 2,483,594 | Oliver | Oct. 4, 1949 |
| 2,484,819 | Ferrill | Oct. 18, 1949 |